US011371209B2

(12) United States Patent
Demski et al.

(10) Patent No.: US 11,371,209 B2
(45) Date of Patent: Jun. 28, 2022

(54) WORK VEHICLE WITH SWITCHABLE PROPULSION CONTROL SYSTEM

(71) Applicant: Deere & Company, Moline, IL (US)

(72) Inventors: Nathan R. Demski, Durango, IA (US); Kristen D. Cadman, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 560 days.

(21) Appl. No.: 16/450,114

(22) Filed: Jun. 24, 2019

(65) Prior Publication Data
US 2020/0399855 A1    Dec. 24, 2020

(51) Int. Cl.
| E02F 9/02 | (2006.01) |
| B60K 26/02 | (2006.01) |
| E02F 9/22 | (2006.01) |
| E02F 9/20 | (2006.01) |
| B62D 55/06 | (2006.01) |

(52) U.S. Cl.
CPC .............. *E02F 9/02* (2013.01); *B60K 26/02* (2013.01); *B62D 55/06* (2013.01); *E02F 9/2004* (2013.01); *E02F 9/2225* (2013.01); *E02F 9/2285* (2013.01)

(58) Field of Classification Search
CPC ......... E02F 9/02; E02F 9/2004; E02F 9/2225; E02F 9/2285; B60K 26/02; B62D 55/06
See application file for complete search history.

(56) References Cited

U.S. PATENT DOCUMENTS

| 5,277,269 A * | 1/1994 | Ichimura | B60W 10/06 60/391 |
| 5,307,631 A * | 5/1994 | Tatsumi | F16H 61/472 60/452 |
| 6,601,670 B2 * | 8/2003 | Kaneda | E02F 9/2012 180/324 |
| 7,036,248 B2 | 5/2006 | Meyeres et al. | |
| 7,273,124 B2 | 9/2007 | Tatsuno et al. | |
| 7,513,110 B2 | 4/2009 | Tatsuno et al. | |
| 7,607,245 B2 | 10/2009 | Satake et al. | |
| 8,359,140 B2 | 1/2013 | Kodaka et al. | |
| 9,017,006 B2 | 4/2015 | Huissoon | |
| 9,561,788 B2 * | 2/2017 | Ito | E02F 9/2004 |
| 11,142,888 B2 * | 10/2021 | Lee | E02F 9/2292 |

(Continued)

*Primary Examiner* — Tony H Winner
*Assistant Examiner* — Michael R Stabley
(74) *Attorney, Agent, or Firm* — Klintworth & Rozenblat IP LLP

(57) ABSTRACT

A propulsion control system includes a travel motor configured to be actuated to drive the track assembly in the forward and reverse travel directions; a propulsion control device actuated in first and second input directions; and a propulsion switching mechanism. In a first propulsion direction mode, when the control device is actuated in the first input direction, the travel motor is actuated to drive in the forward travel direction, and when the control device is actuated in the second input direction, the travel motor is actuated to drive in the reverse travel direction. In a second propulsion direction mode, when the control device is actuated in the first input direction, the travel motor is actuated to drive in the reverse travel direction, and when the control device is actuated in the second input direction, the travel motor is actuated to drive in the forward travel direction.

18 Claims, 4 Drawing Sheets

(56) References Cited

U.S. PATENT DOCUMENTS

2010/0217492 A1\* 8/2010 Kodaka ............... F16H 61/4061
701/50
2016/0146227 A1 5/2016 Hoshaku \* cited by examiner

WORK VEHICLE WITH SWITCHABLE PROPULSION CONTROL SYSTEM

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to a work vehicle and, more particularly, to a work vehicle propulsion control system that provides switchable propulsion control.

BACKGROUND OF THE DISCLOSURE

Work vehicles are used in the construction, agricultural, and forestry industries to carry out various work functions. Excavators, for example, are operative to move soil, sand, gravel, rock, or other suitable material at a jobsite. Excavators require a certain amount of skill, concentration, and stamina to operate via a combination of joysticks, levers, pedals, and the like. At times, operators may attempt to operate the excavator in a manner that is more convenient or comfortable but that may not be ideal for the excavator.

SUMMARY OF THE DISCLOSURE

This disclosure provides a system and method for controlling propulsion of a work vehicle.

In one aspect the disclosure provides a propulsion control system for a work vehicle with a track assembly. The propulsion control system includes a travel motor configured to be actuated in a forward travel direction to drive the track assembly in the forward travel direction and in a reverse travel direction to drive the track assembly in the reverse travel direction; at least one propulsion control device configured to be actuated by an operator in a first input direction and a second input direction; and a propulsion switching mechanism coupled to the travel motor and the at least one propulsion control device. The propulsion switching mechanism is configured to be operated in a first propulsion direction mode in which, when the at least one propulsion control device is actuated in the first input direction, the travel motor is actuated to drive the track assembly in the forward travel direction, and when the at least one propulsion control device is actuated in the second input direction, the travel motor is actuated to drive the track assembly in the reverse travel direction. The hydraulic circuit is configured to be operated in a second propulsion direction mode in which, when the at least one propulsion control device is actuated in the first input direction, the travel motor is actuated to drive the track assembly in the reverse travel direction, and when the at least one propulsion control device is actuated in the second input direction, the travel motor is actuated to drive the track assembly in the forward travel direction.

In another aspect, the disclosure provides a work vehicle that includes a work vehicle includes a frame; a cabin mounted on the frame; a propulsion control device arranged within the cabin and configured to be actuated by an operator in a first input direction and a second input direction; a ground engaging mechanism mounted to the frame; a travel motor coupled to the frame and the ground engaging mechanism, the travel motor configured to selectively drive the ground engaging mechanism based on commands from the propulsion control device in a forward travel direction and in a reverse travel direction; and a propulsion switching mechanism coupled to the travel motor and the at least one propulsion control device. The propulsion switching mechanism is configured to be operated in a first propulsion direction mode in which, when the at least one propulsion control device is actuated in the first input direction, the travel motor is actuated to drive the ground engaging mechanism in the forward travel direction, and when the at least one propulsion control device is actuated in the second input direction, the travel motor is actuated to drive the ground engaging mechanism in the reverse travel direction. The propulsion switching mechanism is configured to be operated in a second propulsion direction mode in which, when the at least one propulsion control device is actuated in the first input direction, the travel motor is actuated to drive the ground engaging mechanism in the reverse travel direction, and when the at least one propulsion control device is actuated in the second input direction, the travel motor is actuated to drive the ground engaging mechanism in the forward travel direction.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
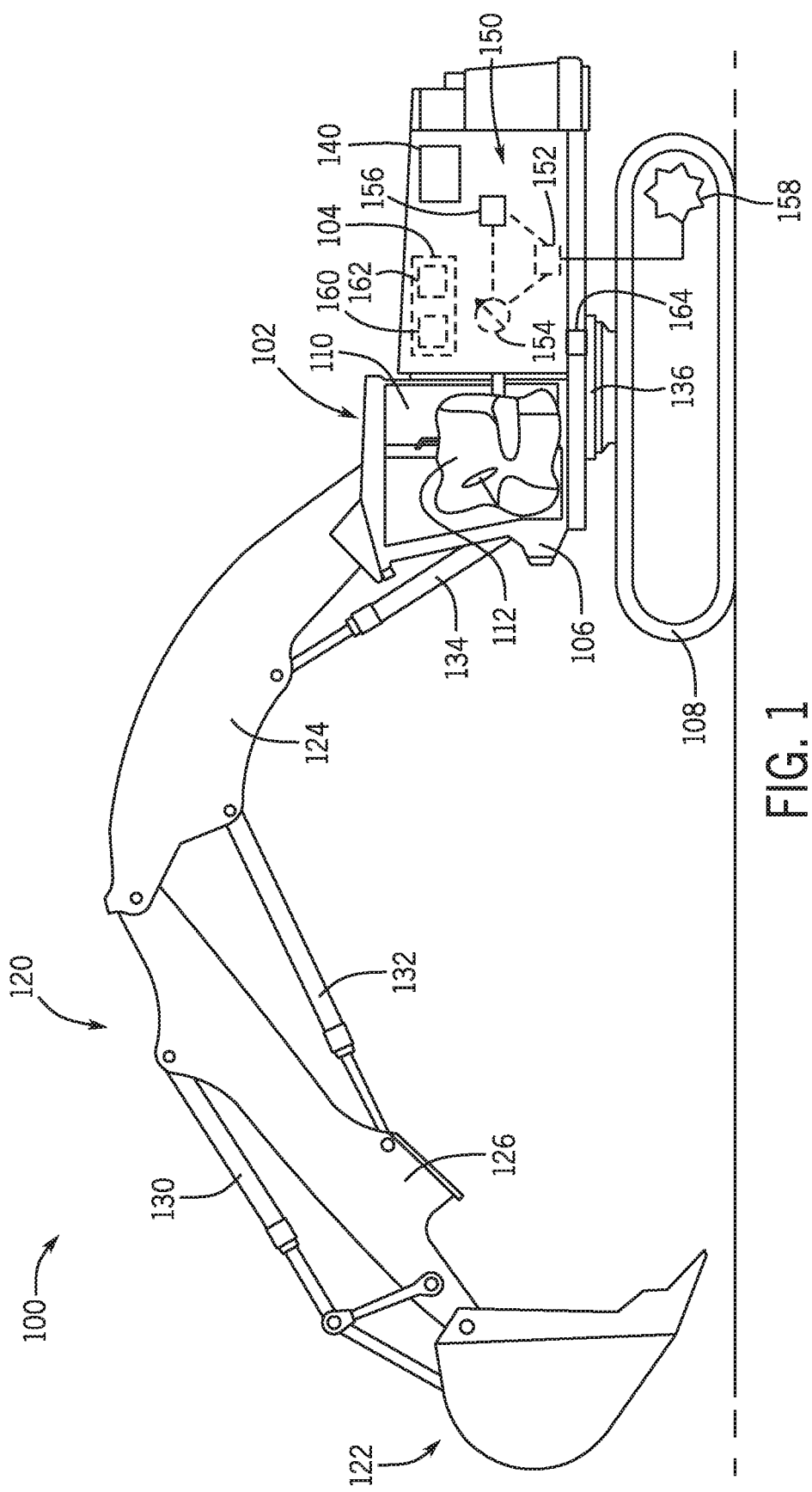
FIG. 1 is side view of a work vehicle in the form an example excavator having a propulsion control system according to example embodiments of the present disclosure.

The following describes one or more example embodiments of the disclosed propulsion control system, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "reverse," "aft," "lateral," "horizontal," and "vertical" may be used. Such terms are defined, at least in part, with respect to the direction in which the work vehicle travels during use. For example, the term "forward" and the abbreviated term "fore" (and any derivatives and variations) refer to a direction corresponding to the primary direction of travel of the work vehicle (particularly with respect to the undercarriage or base of the vehicle), while the terms "aft" and "reverse" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

The following describes one or more example implementations of the disclosed system and method for controlling propulsion of a work vehicle. The disclosed control system, the method of operation, and the work vehicle associated therewith allow for improved performance, more comfortable operation, and decreased vehicle wear, as compared to conventional systems.

A work vehicle, such as an excavator, may have track assemblies and implements operated with a collection of operator control devices. For example, the operator may push one or more operator control devices (e.g., levers or pedals) to propel the vehicle in a forward direction and pull the operator interfaces to propel the vehicle in the reverse direction. Over relatively long travel distances, pushing the operator control devices may become tiring for the operator so much so that the operator may be tempted to pivot and reverse the undercarriage relative to the operator cabin (e.g., such that the operator faces rearward relative to the vehicle, toward the destination), pull the operator control devices, and drive the vehicle in the "reverse direction" to the destination. However, operating in reverse may result in more wear on the track assemblies as compared to operating in a forward direction, thereby resulting in undue wear when the operator attempts to operate in this manner to increase comfort. Embodiments discussed herein provide switchable operator control devices for the propulsion control system in which the operator may select a propulsion direction mode, including a mode in which the operator pulls the operator control devices to travel forward, thereby resulting in more comfortable operation with less wear on the excavator.

As an example, the propulsion control system may include a hydraulic circuit that controls the flow of fluid pressure between a pump and travel motors that drive the ground engagement mechanisms in forward and reverse travel directions based on inputs at the operator control devices. As described below, the propulsion control devices may include directional switching valves that operate to switch the fluid pressure of the signal lines based on the propulsion direction mode such that predetermined operator inputs that result in forward and reverse travel directions in the first propulsion direction mode are redistributed to result in reverse and forward directions, respectively, in the second propulsion direction mode. In some examples, the propulsion control system may use electric switches and/or motor in order to implement the first and second propulsion direction modes. In particular, a controller may map the operator input devices to the travel directions of the motors based on the selected mode.

With reference to the drawings, one or more example implementations of the present disclosure will now be described. While an excavator is illustrated and described herein as an example work vehicle, one skilled in the art will recognize that principles of the control system and the methods disclosed herein may be readily adapted for use in other types of work vehicles, including a loader, a bulldozer, a motor grader, or another type of construction, agricultural, forestry, or utility vehicle. Similarly, the vehicle described herein is a track vehicle, although the disclosure may be implemented with a wheeled vehicle. As such, the present disclosure should not be limited to applications associated with excavators or the particular example excavator shown and described.

FIG. 1 illustrates a propulsion control system 100 implemented in a work vehicle 102 in the form of an example excavator. Generally, an operator controls the excavator 102 and the propulsion control system 100 to perform multiple functions, such as to move and/or manipulate soil or other materials at a jobsite or between jobsites. As described in greater detail below, the propulsion control system 100 may include a controller 104 to implement and/or facilitate the various functions of the excavator discussed herein. Although certain excavator elements are discussed below, the excavator 102 may include any number of additional or alternative systems, subsystems, and elements.

The excavator 102 may generally include a chassis or frame 106 supported by one or more track assemblies 108 or other ground engaging mechanisms for propelling the excavator 102, as discussed in greater detail below. Typically, a track assembly 108 is provided on both sides of the excavator 102.

The excavator 102 may also include a cab 110 forming an operator cabin that is supported on the frame 106. The cab 110 provides an enclosure for an operator seat and an operator console for mounting various operator control devices 112 (e.g., joystick(s), steering wheel, accelerator and brake pedals, dials, buttons, etc.), as well as elements such as communication equipment, operator interfaces providing graphical (or other) input controls and feedback, and other instruments used in the operation of the excavator 102. Particular examples of the operator control devices 112 are discussed in greater detail below.

The excavator 102 may further include a linkage arm 120 with one end attached to the frame 106 and an opposite end supporting an implement 122, which in this embodiment is a bucket, although other implements may be provided. The arm 120 may be formed by a boom 124 extending from the frame 106 and a stick 126 extending from the end of the boom 124 and supporting the bucket 122. The excavator 102 may further include a plurality of example actuators 130, 132, 134, 136 controlled based on commands from the controller 104 and/or the operator via the operator control devices 112, including actuators 130 associated with rotating the bucket 122 relative to the stick 126, actuators 132 rotating the stick 126 relative to the boom 124, actuators 134 for rotating the boom 124 relative to the frame 106, and actuators 136 for rotating the frame 106 relative to the frame 106. The actuators 130, 132, 134, 136 may include an electric motor, a pneumatic actuator, or other type of actuator, including linear, rotational, and/or hydraulic actuators. Additional actuators are discussed below.

The excavator 102 may further include an engine 140 or other power source for providing mechanical or electrical power to various systems, subsystems, and elements of the excavator 102 based on commands from the controller 104 and/or the operator via the operator control devices 112. As examples, the engine 140 may be used to power the example actuators 130, 132, 134, 136 discussed above.

As introduced above, the excavator 102 includes the propulsion control system 100 at least partially implemented by the controller 104 that enables the track assemblies 108 to be driven to propel the excavator 102 in the forward and reverse directions. In one embodiment, the propulsion control system 100 includes a hydraulic circuit 150 or other type of propulsion switching mechanism. As shown, the hydraulic circuit 150 may include at least one valve arrangement 152, pump 154, return tank 156, and travel motor 158. In one example, two travel motors 158 are provided, one for each track assembly 108. In some embodiments, the propulsion control system 100 may be considered to include one or more of the operator control devices 112 to receive operator commands and/or the engine 140 to power the pump 154 and/or other elements. Although one type of hydraulic circuit 150 is discussed below, other mechanisms may be provided for collectively driving the track assemblies 108. Additionally, although the propulsion control system 100 is described below with travel motors 158 as hydraulic motors within a hydraulic circuit 150, other types of motors or actuation mechanisms and/or other types of propulsion switching mechanisms may be used, including electric travel motors. Moreover, the hydraulic circuit 150 may be partially implemented or replaced with electric switching mechanisms, as described below.

As described in greater detail below, based on operator inputs via the operator control devices 112, the valve arrangement 152 is actuated to appropriately direct and distribute hydraulic fluid through the hydraulic circuit 150 between the pump 154 and tank 156 to drive the travel motors 158. Although not depicted in detail in FIG. 1, the travel motors 158 drive the track assemblies 108 (e.g., via final drives, gearing transmissions, and the like) for propulsion of the excavator 102. Generally, the track assemblies 108 may be collectively driven together to propel the excavator 102 in the forward and reverse directions along a generally straight line or individually driven to steer or turn the excavator 102. Additional details regarding operation of the propulsion control system 100 are provided below.

As noted above, the propulsion control system 100 may be at least partially implemented with the controller 104 that enables operation of the excavator 102 in at least two propulsion direction modes based on a selection by the operator. In a first or primary propulsion direction mode, the controller 104 commands the hydraulic circuit 150 such that pushing the operator control devices 112 functions to propel the excavator 102 in a forward direction and pulling the operator control devices 112 functions to propel the excavator 102 in a reverse direction; and in a second or secondary propulsion direction mode, the controller 104 commands the hydraulic circuit 150 such that pulling the operator control devices 112 functions to propel the excavator 102 in a forward direction and pushing the operator control devices 112 functions to propel the excavator 102 in a reverse direction.

Generally, the controller 104 may be on-board, remote, or a combination thereof as a dedicated controller for the propulsion control system or a common controller for controlling overall operation of the excavator 102. The controller 104 may include any suitable type of processor 160 and memory 162 containing instructions executable by the processor 160 to carry out the various functions described herein. The controller 104 may be configured as a hardwired computing circuit (or circuits), a programmable circuit, a hydraulic controller, an electrical controller, an electro-hydraulic controller, or otherwise. As such, the controller 104 may be configured to execute various computational and control functionality with respect to the excavator 102. In some embodiments, the controller 104 may be configured to receive input signals in various formats (e.g., as hydraulic signals, voltage signals, current signals, and so on) and to output command signals in various formats (e.g., as hydraulic signals, voltage signals, current signals, mechanical movements, and so on). In some embodiments, the controller 104 (or a portion thereof) may be configured as an assembly of hydraulic components (e.g., valves, flow lines, tanks, and so on), such that control of various devices (e.g., pumps or motors) may be affected with, and based upon, hydraulic, mechanical, or other signals and movements.

The excavator 102 may further include a number of sensors to facilitate operation. For example, sensors may be associated with the actuators 130, 132, 134, 136 discussed herein. In one example, a position sensor 164 may be provided on the frame 106 and/or cab 110 that indicates the position of the cab 110 (and operator) relative to the frame 106. Further, sensors may be associated with the operator control devices 112 to determine the respective positions of the operator control devices 112 to reflect the operator input for receipt and implementation by the controller 104.

Figure 2:
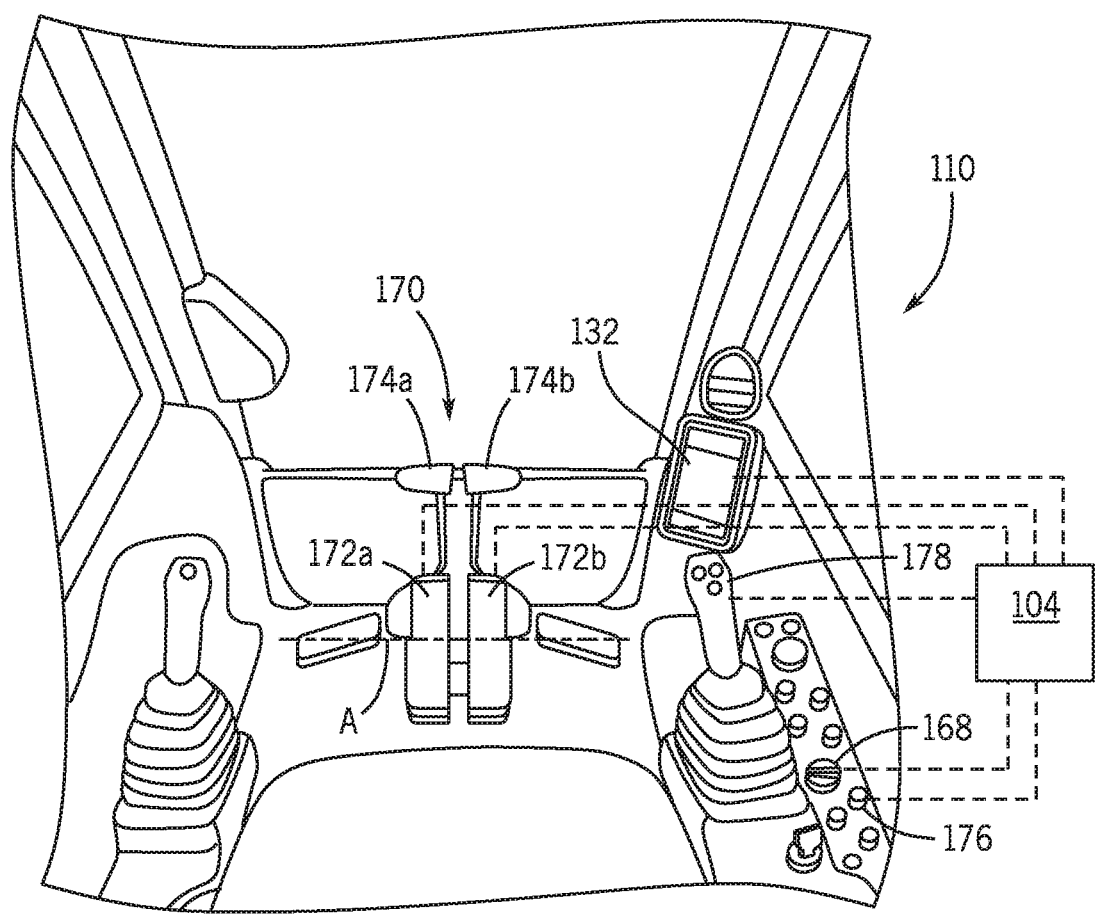
FIG. 2 is a simplified isometric view of an operator cabin of the excavator of FIG. 1 according to example embodiments of the present disclosure.

An example view of the operator cab 110 is depicted in FIG. 2, particularly a number of operator control devices 112 that enable operation with the systems of the excavator 102 via the controller 104. As examples, the operator control devices 112 include a propulsion direction mode selection switch 168 and a set of propulsion control devices 170, as well as a speed input device 176, an implement input device 178, and a number of additional devices that may be in the form of buttons, switches, or dials, as examples.

The propulsion direction mode selection switch 168 may take any suitable form. The propulsion direction mode selection switch 168 enables the operator to select the propulsion direction mode, including the first propulsion direction mode or the second propulsion direction mode, that dictates the interaction between the propulsion control devices 170 and travel motors 158, as described in greater detail below.

The propulsion control devices 170 that are associated with the propulsion control system 100 include a left (foot) pedal 172a and a left (hand) lever 174a associated with the left track assembly 108 and a right (foot) pedal 172b and a right (hand) lever 174b associated with the right track assembly 108. Typically, the left pedal 172a and left lever 174a perform the same function and/or may be locked for collective movement, and similarly, the right pedal 172b and right lever 174b perform the same function and/or may be locked for collective movement. Each pedal 172a, 172b may be configured to pivot about a horizontal axis, for example, by pressing the forward portion of the respective pedal 172a, 172b with the fore-foot or by pressing the rear portion of the respective pedal 172a, 172b with the heel. In some examples, the pedals 172a, 172b may be "V-shaped" to facilitate this forward and backward movement. Similarly, each lever 174a, 174b may be pivoted from a respective base in the forward and rearward input directions. As such, the pedals 172a, 172b and levers 174a, 174b may be "pushed" (directed away from the operator) or "pulled" (directed toward the operator).

Accordingly, the pedals 172a, 172b and levers 174a, 174b are propulsion control devices 170 to control the direction of travel of the excavator 102. As noted above, the left pedal 172a and left lever 174a are associated with actuation of the left track assembly 108, and the right pedal 172b and right lever 174*b* are associated with actuation of the right track assembly 108. As such, when the left pedal 172*a* (and/or lever 174*a*) and the right pedal 172*b* (and/or lever 174*b*) are repositioned in the same input direction, the excavator 102 travels in a straight line since the left and right track assemblies 108 are both being driven in the same direction. When the left pedal 172*a* (and/or lever 174*a*) and the right pedal 172*b* (and/or lever 174*b*) are repositioned in different input directions or only one side is repositioned, the excavator 102 turns since the left and right track assemblies 108 are both being driven in the different direction or only an individual track assembly 108 is being driven.

As noted above, in the first propulsion direction mode, repositioning the pedals 172*a*, 172*b* and levers 174*a*, 174*b* in the forward input direction (e.g., "pushing") functions to actuate driving of the track assemblies 108 in the forward travel direction and repositioning the pedals 172*a*, 172*b* and levers 174*a*, 174*b* in the rearward input direction (e.g., "pulling") functions to actuate driving of the track assemblies 108 in the reverse travel direction. Upon transitioning into the second propulsion direction mode, repositioning the pedals 172*a*, 172*b* and levers 174*a*, 174*b* in the forward input direction functions to actuate driving of the track assemblies 108 in the reverse travel direction and repositioning the pedals 172*a*, 172*b* and levers 174*a*, 174*b* in the rearward input direction functions to actuate driving of the track assemblies 108 in the forward travel direction. In other words, the propulsion direction mode dictates the travel direction of the excavator in view of the respective input position of the propulsion control devices 170.

In some instances, the pushing of the propulsion control devices 170 away from the operator may become tedious or result in fatigue for the operator. In conventional excavators, this may result in the operator traveling between job site locations in the reverse travel direction (e.g., by turning the cab in the opposite direction relative to the frame 106 and pulling back on the propulsion control devices 170). However, operating the excavator in the reverse travel direction may result in undue wear on the track assemblies 108. Accordingly, in this situation, the operator may transition into the second propulsion direction mode such that pulling on the propulsion control devices 170 results in the propulsion of the excavator 102 in the forward travel direction in a manner that is more comfortable for the operator and results in less wear for the excavator 102.

As introduced above, additional operator control devices 112 in the cab 110 may include implement one or more input devices 178 that control one or more of the actuators 130, 132, 134, 136. As additionally illustrated in FIG. 2, excavator 102 includes a display device 180, such as a monitor, that is operatively coupled to controller 104 for providing visual feedback to the operator. In one embodiment, display device 180 is provided as a simple flat screen display tablet in operator cab 110. In other embodiments, display device 180 is a heads-up style display where images are projected or otherwise displayed, for example, on the windows of operator cab 110. Other suitable display devices 180 may be provided. Generally, the display device 180 inside operator cab 110 may display or otherwise communicate the selected propulsion direction mode and other propulsion or directional information to the operator.

Figure 3A:
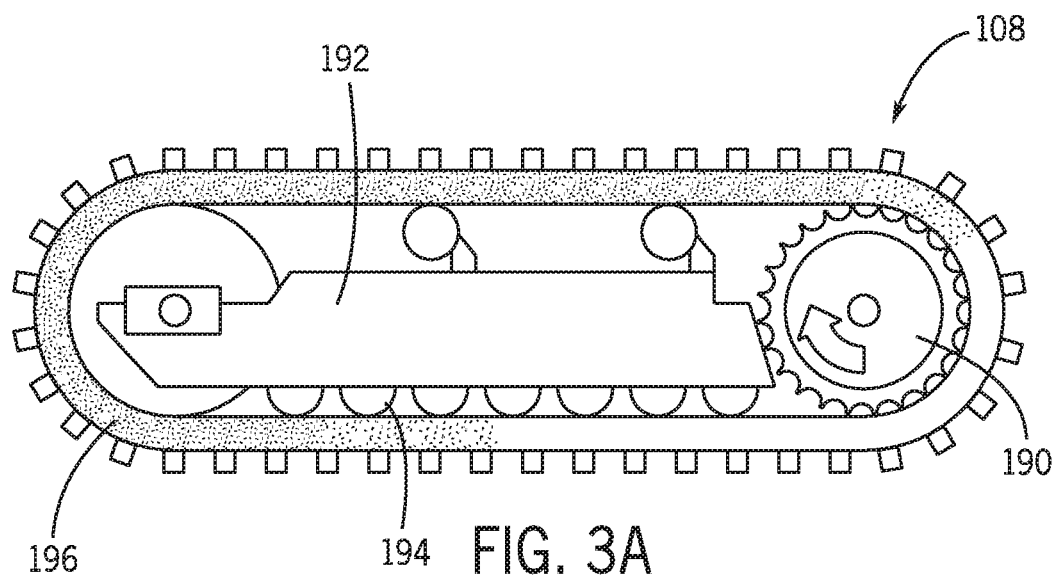
FIGS. 3A and 3B are side views of a track assembly of the excavator of FIG. 1 according to the example embodiments of the present disclosure.
Figure 3B:
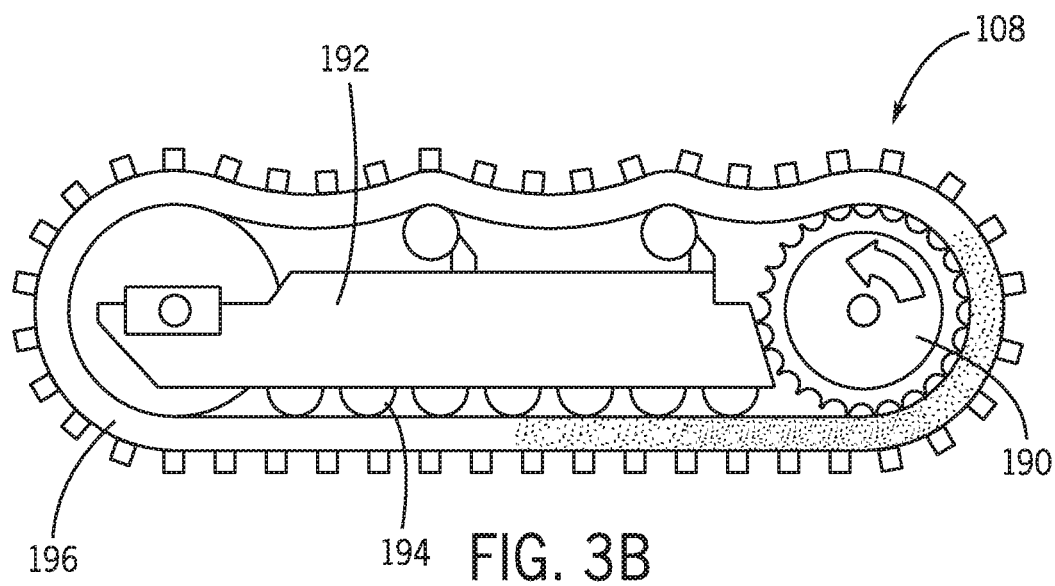

Reference is now made to FIGS. 3A and 3B, which depict side views of representations of the left side track assembly 108. The view of FIG. 3A depicts operation of the track assembly 108 traveling in a reverse travel direction, and FIG. 3B depicts operation of the track assembly 108 traveling in a forward travel direction.

Generally, the track assembly 108 includes a drive wheel 190 supported by an undercarriage 192 that further includes any number of guide or idler wheels 194. A track 196, formed by a series of links and pins, extends about the wheels 190, 194 to engage the ground. The drive wheel 190 is driven by the travel motor 158 in either direction to, in turn, drive the track 196 in the corresponding travel direction, thereby propelling the excavator 102 in forward and reverse travel directions. In this example, the drive wheel 190 positioned within the track assembly 108 such that the driving power for the track 196 is transferred from the rear portion to propel the excavator 102. In the view of FIGS. 1, 3A, and 3B, this configuration would result in the respective hydraulic motor 158 driving the drive wheel 190 of the track assembly 108 in a counter-clockwise direction when traveling in the forward travel direction and in a clockwise direction when traveling in the reverse travel direction. In the views of FIGS. 3A and 3B, the areas of elevated stress on the track 196 are highlighted for the reverse and forward travel directions, respectively. As can be understood by the view of FIG. 3A, operation in the reverse travel direction results in the drive wheel 190 pulling a substantial portion of the track 196 (e.g., the upper and rear sides), thereby resulting in elevated wear resulting from contact, load, and motion for the drive wheel 190, pins and links of the track 196, and the undercarriage 192. As can be understood by the view of FIG. 3B, operation in the forward travel direction results in the drive wheel 190 pulling a lesser portion of the track 196 (e.g., primarily the front portion), thereby resulting in relatively less wear resulting from contact, load, and motion for the drive wheel 190, pins and links of the track 196, and the undercarriage 192. Accordingly, it is beneficial from a durability perspective to generally travel in the forward travel direction.

Figure 4:
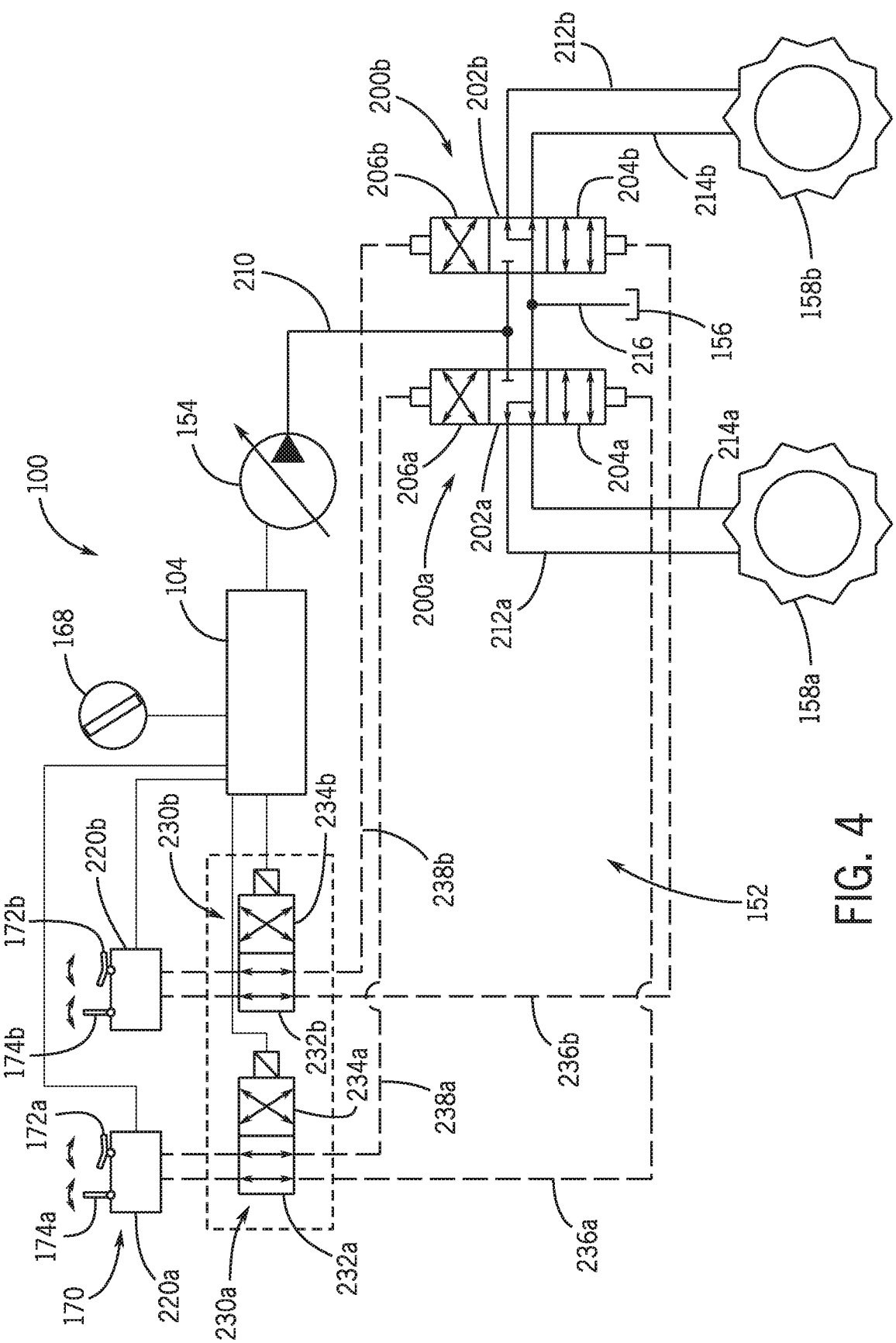
FIG. 4 is a hydraulic circuit and functional block diagram illustrating the propulsion control system of the excavator of FIG. 1 according to example embodiments of the present disclosure.

Reference is now made to FIG. 4, which schematically depicts the hydraulic circuit 150 of the propulsion control system 100. As introduced above, the hydraulic circuit 150 may be controlled via signals from the controller 104 based on commands from the propulsion control devices 170 (e.g., pedals 172*a*, 172*b* and levers 174*a*, 174*b*) in order to actuate the valve arrangement 152 and the travel motors 158, which include a left travel motor 158*a* associated with the left side track assembly 108 and a right travel motor 158*b* associated with the right side track assembly 108.

Generally, fluid pressure (as "main fluid pressure") supplied by the pump 154 may be routed through main control valves 200*a*, 200*b* via various conduits, hoses, and/or lines 210, 212*a*, 212*b*, 214*a*, 214*b*, 216 in order to drive the travel motors 158*a*, 158*b*. The flow from the pump 154 may be controlled in various ways (e.g., through control of various control valves) in order to cause selective movement of the travel motors 158*a*, 158*b*, including electro-mechanical devices (e.g., solenoids). In this example, the main control valves 200*a*, 200*b* are respectively controlled by pilot control devices 220*a*, 220*b*, via directional switching valves 230*a*, 230*b*, that are actuated based on operator input at the propulsion control devices 170 and propulsion direction mode selection switch 168. As described below, the positions of the main control valves 200*a*, 200*b* in combination with the positions of the directional switching valves 230*a*, 230*b* dictate the direction of fluid flow through the travel motors 158*a*, 158*b*, and thus, the direction of the travel. The travel motors 158*a*, 158*b* have dual ports such that fluid pressure at first ports (e.g., via lines 212*a*, 212*b*) result in rotation and propulsion in a forward travel direction and fluid pressure at the other ports (e.g., via lines 214a, 214b) results in rotation and propulsion in a reverse travel direction.

As such, in the depicted arrangement, the hydraulic circuit 150 includes a main control valve 200a, direction switching valve 230a, pilot control device 220a, and lines 236a, 238a, 212a, 214a are associated with the left travel motor 158a and main control valve 200b, direction switching valve 230b, pilot control device 220b, and lines 236b, 238b, 212b, 214b are associated with the right travel motor 158b. The pump 154, supply line 210, return tank 156, and return line 216 service both sides of the hydraulic circuit 150.

During operation, based on commands from the propulsion control devices 170 (either directly or via the controller 104), the pilot control devices 220a, 220b operate to selectively distribute fluid pressure (as "pilot fluid pressure") via first pilot signal lines 236a, 236b and second pilot signal lines 238a, 238b, through the directional switching valve 230a, 230b, to the main control valves 200a, 200b. As shown, the pilot signal lines 236a, 236b, 238a, 238b are fluidly coupled to each side of the main control valves 200a, 200b. In particular, first pilot signal lines 236a, 236b are fluidly coupled to one side of the main control valves 200a, 200b such that the fluid pressure through these pilot signal lines 236a, 236b functions to position the main control valves 200a, 200b into first positions 204a, 204b; and second pilot signal lines 238a, 238b are fluidly coupled to the other side of the main control valves 200a, 200b such that the fluid pressure through these pilot signal lines 238a, 238b functions to position the main control valves 200a, 200b into second positions 206a, 206b. As described below, the positions of the main control valves 200a, 200b dictate the resulting drive direction of the travel motors 158a, 158b.

Each directional switching valve 230a, 230b has two directional switching positions 232a, 232b; 234a, 234b that are selectively controlled by the controller 104 based on operator input at the propulsion direction mode selection switch 168. As described in greater detail below, the first positions 204a, 204b of the directional switching valves 230a, 230b correspond to the first propulsion direction mode, and the second positions 206a, 206b of the directional switching valves 230a, 230b correspond to the second propulsion direction mode. In particular, upon selection of a propulsion direction mode at switch 168, the controller 104 generates an electric signal to reposition the directional switching valves 230a, 230b into the first positions 232a, 232b or the second positions 234a, 234b. As described below, the directional switching valves 230a, 230b operate to switch the direction of pilot pressure flow through the pilot signals lines 236a, 236b, 238a, 238b, thereby modifying the manner by which the main control valves 200a, 200b are repositioned. In particular, as discussed in greater detail below, repositioning the directional switching valves 230a, 230b reverses operation of the main control valves 200a, 200b relative to the operator control devices 170 and pilot control devices 200a, 200b by selectively redirecting (or swapping) the pilot fluid pressure from the first pilot switching lines 236a, 236b to the second pilot switching lines 238a, 238b or from the second pilot switching lines 238a, 238b to the first pilot switching lines 236a, 236b.

As introduced above, the left directional switching valve 230a is associated with controlling the position of the left main control valve 200a, and the right directional switching valve 230b is associated with controlling the position of the right main control valve 200b. Each main control valve 200a, 200b has three positions, including a neutral position 202a, 202b; a first position 204a, 204b; and a second position 206a, 206b. In the neutral position 202a, 202b, the main control valves 200a, 200b is "off" and prevents flow from supply line 210 of pump 154 from flowing through the main control valves 200a, 200b to actuate the travel motors 158a, 158b. As described in greater detail below, upon movement of the main control valves 200a, 200b into the first or second positions 204a, 204b, 206a, 206b, fluid is driven by pump 154 through the main control valves 200a, 200b in and out of designated sides of the hydraulic travel motors 158a, 158b via the main control lines 212a, 212b, 214a, 214b to drive the motors 158a, 158b in a selected travel direction. After flowing through the travel motors 158a, 158b, fluid is routed back through the main control valves 200a, 200b to tank 156.

Operation of the excavator 102 in each propulsion direction mode and in each travel direction will now be described in greater detail below. In the discussion below, the left and right levers 174a, 174b and left and right pedals 172a, 172b are operated in concert, e.g., such that the operator is maneuvering the excavator 102 in relatively straight forward or reverse directions.

Forward travel direction in the first propulsion direction mode: As noted above, the first propulsion direction mode is selected by the operator via the propulsion direction mode selection switch 168. Upon selection, the directional switching valves 230a, 230b are placed in the first positions 232a, 232b (as depicted in FIG. 4). In the first propulsion direction mode, the operator pushes the pedals 172a, 172b or levers 174a, 174b away from the operator to travel in a forward travel direction. In response, the pilot control devices 220a, 220b direct fluid through directional switching valves 230a, 230b via the first pilot signal lines 236a, 236b to place the main control valves 200a, 200b in the first positions 204a, 204b. In effect, with the directional switching valves 230a, 230b in the first directional switching valve positions 232a, 232b, the pilot fluid pressures from the pilot control devices 230a, 230b are maintained in the first pilot signal lines 236a, 236b. With the main control valves 200a, 200b in the first positions 204a, 204b, the pump 154 is commanded to generate fluid pressure through the supply line 210 and through the first main control lines 212a, 212b to the respective first side of the travel motors 158a, 158b such that the travel motors 158a, 158b drive the corresponding track assemblies 108 in the forward travel direction. The fluid exits the travel motor 158a, 158b through the second main control lines 214a, 214b, through the main control valves 200a, 200b, and through the return line 216 to tank 156. Accordingly, the operator pushes the pedals 172a, 172b and levers 174a, 174b in the first propulsion direction mode such that the excavator 102 is propelled in the forward travel direction.

Reverse travel direction in the first propulsion direction mode: As noted above, the first propulsion direction mode is selected by the operator via the propulsion direction mode selection switch 168. Upon selection, the directional switching valves 230a, 230b are placed in the first positions 232a, 232b. In the first propulsion direction mode, the operator pulls the pedals 172a, 172b or levers 174a, 174b towards the operator to travel in the reverse travel direction. In response, the pilot control devices 220a, 220b direct fluid through directional switching valves 230a, 230b via the second pilot signal lines 238a, 238b to place the main control valves 200a, 200b in the second positions 206a, 206b. In effect, with the directional switching valves 230a, 230b in the first directional switching valve positions 232a, 232b, the pilot fluid pressures from the pilot control devices 230a, 230b are maintained in the second pilot signal lines 238a, 238b to the main control valves 200*a*, 200*b*. With the main control valves 200*a*, 200*b* in the second positions 206*a*, 206*b*, the pump 154 is commanded to generate fluid pressure through the supply line 210 and through the second main control lines 214*a*, 214*b* to the respective second side of the travel motors 158*a*, 158*b* such that the travel motors 158*a*, 158*b* drive the corresponding track assemblies 108 in the reverse travel direction. In effect, the second positions 206*a*, 206*b* function to reverse the fluid through the control lines (e.g., from first main control lines 212*a*, 212*b* to the second main control lines 214*a*, 214*b*). The fluid exits the travel motor 158*a*, 158*b* through the first main control lines 212*a*, 212*b*, through the main control valves 200*a*, 200*b*, and through the return line 216 to tank 156. Accordingly, the operator pulls the pedals 172*a*, 172*b* and levers 174*a*, 174*b* in the first propulsion direction mode such that the excavator is propelled in the reverse travel direction.

Forward travel direction in the second propulsion direction mode: As noted above, the second propulsion direction mode is selected by the operator via the propulsion direction mode selection switch 168. Upon selection, the directional switching valves 230*a*, 230*b* are placed in the second positions 234*a*, 234*b*. Relative to the first positions 232*a*, 232*b* of the directional switching valves 230*a*, 230*b*, the second positions 234*a*, 234*b* reverse the direction of the pilot signals through the pilot signal lines 236*a*, 236*b*, 238*a*, 238*b*. As such, in the second propulsion direction mode, the operator pulls the pedals 172*a*, 172*b* or levers 174*a*, 174*b* toward the operator to travel in the forward travel direction; and in response, the pilot control devices 220*a*, 220*b* direct pilot fluid through directional switching valves 230*a*, 230*b*, which redirect the pilot fluid to the first pilot signal lines 236*a*, 236*b* to place the main control valves 200*a*, 200*b* in the first positions 204*a*, 204*b*. In effect, with the directional switching valves 230*a*, 230*b* in the second directional switching valve positions 234*a*, 234*b*, the pilot fluid pressures from the pilot control devices 230*a*, 230*b* are switched between the first pilot signal lines 236*a*, 236*b* and the second pilot signal lines 236*a*, 236*b* to the main control valves 200*a*, 200*b*. With the main control valves 200*a*, 200*b* in the first positions 204*a*, 204*b*, the pump 154 is commanded to generate fluid pressure through the supply line 210 and through the first main control lines 212*a*, 212*b* to the respective first side of the travel motors 158*a*, 158*b* such that the travel motors 158*a*, 158*b* drive the corresponding track assemblies 108 in the forward travel direction. The fluid exits the travel motor 158*a*, 158*b* through the second main control lines 214*a*, 214*b*, through the main control valves 200*a*, 200*b*, and through the return line 216 to tank 156. Accordingly, the operator pulls the pedals 172*a*, 172*b* and levers 174*a*, 174*b* in the second propulsion direction mode such that the excavator is propelled in the forward travel direction.

Reverse travel direction in the second propulsion direction mode: As noted above, the second propulsion direction mode is selected by the operator via the propulsion direction mode selection switch 168. Upon selection, the directional switching valves 230*a*, 230*b* are placed in the second positions 234*a*, 234*b*. Relative to the first positions 232*a*, 232*b* of the directional switching valves 230*a*, 230*b*, the second positions 234*a*, 234*b* reverses the pilot fluid signals relative to the first propulsion direction mode to flow through the second pilot signal lines 238*a*, 238*b* (instead of the first pilot signal lines 236*a*, 236*b* in the first propulsion direction mode). As such, in the second propulsion direction mode, the operator pushes the pedals 172*a*, 172*b* or levers 174*a*, 174*b* away from the operator to travel in the reverse travel direction; and in response, the pilot control devices 220*a*, 220*b* direct fluid through directional switching valves 230*a*, 230*b* via the second pilot signal lines 238*a*, 238*b* to place the main control valves 200*a*, 200*b* in the second positions 206*a*, 206*b*. In effect, with the directional switching valves 230*a*, 230*b* in the second directional switching valve positions 234*a*, 234*b*, the pilot fluid pressures from the pilot control devices 230*a*, 230*b* are switched between the first pilot signal lines 236*a*, 236*b* and the second pilot signal lines 236*a*, 236*b* to the main control valves 200*a*, 200*b*. With the main control valves 200*a*, 200*b* in the second positions 206*a*, 206*b*, the pump 154 is commanded to generate fluid pressure through the supply line 210 and through the second main control lines 214*a*, 214*b* to the respective second side of the travel motors 158*a*, 158*b* such that the travel motors 158*a*, 158*b* drive the corresponding track assemblies 108 in the reverse travel direction. The fluid exits the travel motor 158*a*, 158*b* through the first main control lines 212*a*, 212*b*, through the main control valves 200*a*, 200*b*, and through the return line 216 to tank 156. Accordingly, the operator pushes the pedals 172*a*, 172*b* and levers 174*a*, 174*b* in the second propulsion direction mode such that the excavator is propelled in the reverse travel direction.

In some embodiments, the hydraulic circuit 150 may be replaced or modified with an electric or electric-hydraulic control arrangement as a main control pressure distribution mechanism to control the relationship between the operator control devices and the travel motors. As one example, the hydraulic circuit 150 may omit the pilot control devices 220*a*, 220*b* and directional switching valves 230*a*, 230*b*, and the controller 104 may directly command the main control valves 200*a*, 200*b* based the mode selection from the propulsion direction mode selection switch 168 to operate in the following manner: in the first propulsion direction mode with a forward input direction, the controller 104 commands the main control valves 200*a*, 200*b* into the first position 204*a*, 204*b* to drive the travel motors 158*a*, 158*b* in the first travel direction; in the first propulsion direction mode with a rearward input direction, the controller 104 commands the main control valves 200*a*, 200*b* into the second position 206*a*, 206*b* to drive the travel motors 158*a*, 158*b* in the second travel direction; in the second propulsion direction mode with a rearward input direction, the controller 104 commands the main control valves 200*a*, 200*b* into the first position 204*a*, 204*b* to drive the travel motors 158*a*, 158*b* in the first travel direction; and in the second propulsion direction mode with a forward input direction, the controller 104 commands the main control valves 200*a*, 200*b* into the first position 204*a*, 204*b* to drive the travel motors 158*a*, 158*b* in the second travel direction. In effect, the input directions of the input control devices 170 are mapped to the commands for the main control valves 200*a*, 200*b* based on the selected propulsion direction mode. As a further example, the travel motors 158*a*, 158*b* may be directly commanded by the controller 104, particularly in embodiments in which the travel motors 158*a*, 158*b* are electric motors.

Additionally, some examples may include propulsion control system 100 that further consider the position of the cab 110 relative to the frame 106. In particular, the position sensor 164 may be provided on the frame 106 and/or cab 110 that indicates the position of the cab 110 (and operator) relative to the frame 106. In response, when the cab 110 is oriented in the same direction as the frame 106, the propulsion control system 100 may automatically operate in the first propulsion direction mode or suggest to the operator (via display device 180) to operate in the first propulsion direction mode; and when the cab 110 is oriented in the opposite direction as the frame 106, the propulsion control system 100 may automatically operate in the second propulsion direction mode or suggest to the operator (via display device 180) to operate in the second propulsion direction mode.

Accordingly, embodiments discussed herein provide systems and methods for controlling propulsion of a work vehicle in which the user may select the propulsion direction associated with the control devices. This enables improved performance, enhanced operator preference, more comfortable operation, and decreased vehicle wear, as compared to conventional systems, particularly in a manner that does not require a fundamental change in arrangement or design of typical excavation steering or drive systems.

As will be appreciated by one skilled in the art, certain aspects of the disclosed subject matter may be embodied as a method, system (e.g., a work vehicle control system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

Conventional techniques related to signal processing, data transmission, signaling, control, and other functional aspects of the systems (and the individual operating components of the systems) may not be described in detail herein for brevity. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Aspects of certain embodiments are described herein may be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block (or otherwise described herein) may occur out of the order noted in the figures. For example, two blocks shown in succession (or two operations described in succession) may, in fact, be executed substantially concurrently, or the blocks (or operations) may sometimes be executed in the reverse order, depending upon the functionality involved. It will also be noted that each block of any block diagram and/or flowchart illustration, and combinations of blocks in any block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Also, the following examples are provided, which are numbered for easier reference.

1. A propulsion control system for a work vehicle with a track assembly, comprising: a travel motor configured to be actuated in a forward travel direction to drive the track assembly in the forward travel direction and in a reverse travel direction to drive the track assembly in the reverse travel direction; at least one propulsion control device configured to be actuated by an operator in a first input direction and a second input direction; and a propulsion switching mechanism coupled to the travel motor and the at least one propulsion control device; wherein the propulsion switching mechanism is configured to be operated in a first propulsion direction mode in which, when the at least one propulsion control device is actuated in the first input direction, the travel motor is actuated to drive the track assembly in the forward travel direction, and when the at least one propulsion control device is actuated in the second input direction, the travel motor is actuated to drive the track assembly in the reverse travel direction; and wherein the hydraulic circuit is configured to be operated in a second propulsion direction mode in which, when the at least one propulsion control device is actuated in the first input direction, the travel motor is actuated to drive the track assembly in the reverse travel direction, and when the at least one propulsion control device is actuated in the second input direction, the travel motor is actuated to drive the track assembly in the forward travel direction.

2. The propulsion control system of example 1, wherein the propulsion switching mechanism includes a hydraulic circuit comprising: a pump fluidly coupled to the travel motor to provide main fluid pressure to drive the travel motor; and a main control valve fluidly coupled in between the pump and the travel motor to control the main fluid pressure to the travel motor, the main control valve having a first main control valve position in which the main fluid pressure is directed to drive the travel motor in the forward travel direction and a second main control valve position in which the main fluid pressure is directed to drive the travel motor in the reverse travel direction.

3. The propulsion control system of example 2, wherein the hydraulic circuit further comprises: a pilot control device fluidly coupled to provide a pilot fluid pressure to reposition the main control valve between the first main control valve position and the second main control valve position; and a directional switching valve fluidly coupled in between the pilot control device and the main control valve, the directional switching valve having a first directional switching position associated with the first propulsion direction mode and a second directional switching position associated with the second propulsion direction mode.

4. The propulsion control system of example 3, wherein the pilot control device is fluidly coupled to the main control valve via the directional switching valve with a first pilot signal line and a second pilot signal line to supply the pilot fluid pressure to the main control valve.

5. The propulsion control system of example 4, wherein, when the directional switching valve is in the first directional switching valve position, the pilot fluid pressure from the pilot control device is maintained in the first pilot signal line and the second pilot signal line relative to the main control valve, and wherein, when the directional switching valve is in the second directional switching valve position, the pilot fluid pressure from the pilot control device is swapped in the first pilot signal line and the second pilot signal line relative to the main control valve.

6. The propulsion control system of example 5, further comprising a controller configured to reposition the directional switching valve between the first directional switching valve position and the second directional switching valve position.

7. The propulsion control system of example 6, further comprising a propulsion direction mode selection switch coupled to the directional switching valve; wherein the propulsion direction mode selection switch is configured to receive a first direction mode selection input representing the first propulsion direction mode and, in response, to command the directional switching valve into the first directional switching valve position; and wherein the propulsion direction mode selection switch is configured to receive a second direction mode selection input representing the second propulsion direction mode and, in response, to command the directional switching valve into the second directional switching valve position.

8. The propulsion control system of example 2, wherein the at least one propulsion control device includes a hand lever configured to be actuated by the operator by pivoting the hand lever away from the operator as the first input direction and towards the operator as the second input direction.

9. The propulsion control system of example 2, wherein the at least one propulsion control device includes a foot pedal configured to be actuated by the operator by pivoting the foot pedal away from the operator as the first input direction and towards the operator as the second input direction.

10. The propulsion control system of example 2, wherein the directional switching valve is fluidly coupled to the main control valve with a first pilot signal line and a second pilot signal line, and wherein the directional switching valve has a first directional switching position associated with the first propulsion direction mode and a second directional switching position associated with the second propulsion direction mode; wherein the travel motor is fluidly coupled to the main control valve via a first main line and a second main line; wherein, when in the first propulsion direction mode and when the operator actuates the at least one propulsion control device in the first input direction, the directional switching valve directs the pilot fluid pressure from the pilot control device through the first pilot signal line to place the main control valve in the first main control valve position such that main fluid pressure from the pump is directed through the first main line to actuate the travel motor in the first travel direction; wherein, when in the first propulsion direction mode and when the operator actuates the at least one propulsion control device in the second input direction, the directional switching valve directs the pilot fluid pressure from the pilot control device through the second pilot signal line to place the main control valve in the second main control valve position such that main fluid pressure from the pump is directed through the second main line to actuate the travel motor in the second travel direction; wherein, when in the second propulsion direction mode and when the operator actuates the at least one propulsion control device in the second input direction, the directional switching valve redirects the pilot fluid pressure from the pilot control device into the first pilot signal line to place the main control valve in the first main control valve position such that main fluid pressure from the pump is directed through the first main line to actuate the travel motor in the first travel direction; and wherein, when in the second propulsion direction mode and when the operator actuates the at least one propulsion control device in the first input direction, the directional switching valve redirects the pilot fluid pressure from the pilot control device into the first pilot signal line to place the main control valve in the second main control valve position such that main fluid pressure from the pump is directed through the second main line to actuate the travel motor in the second travel direction.

11. A work vehicle, comprising: a frame; a cabin mounted on the frame; a propulsion control device arranged within the cabin and configured to be actuated by an operator in a first input direction and a second input direction; a ground engaging mechanism mounted to the frame; a travel motor coupled to the frame and the ground engaging mechanism, the travel motor configured to selectively drive the ground engaging mechanism based on commands from the propulsion control device in a forward travel direction and in a reverse travel direction; and a propulsion switching mechanism coupled to the travel motor and the at least one propulsion control device; wherein the propulsion switching mechanism is configured to be operated in a first propulsion direction mode in which, when the at least one propulsion control device is actuated in the first input direction, the travel motor is actuated to drive the ground engaging mechanism in the forward travel direction, and when the at least one propulsion control device is actuated in the second input direction, the travel motor is actuated to drive the ground engaging mechanism in the reverse travel direction; and wherein the propulsion switching mechanism is configured to be operated in a second propulsion direction mode in which, when the at least one propulsion control device is actuated in the first input direction, the travel motor is actuated to drive the ground engaging mechanism in the reverse travel direction, and when the at least one propulsion control device is actuated in the second input direction, the travel motor is actuated to drive the ground engaging mechanism in the forward travel direction.

12. The work vehicle of example 11, wherein the propulsion switching mechanism includes hydraulic circuit and the ground engaging mechanism includes a track assembly, wherein the hydraulic circuit comprises: a pump fluidly coupled to the travel motor to provide main fluid pressure to drive the travel motor; and a main control valve fluidly coupled in between the pump and the travel motor to control the main fluid pressure to the travel motor, the main control valve having a first main control valve position in which the main fluid pressure is directed to drive the travel motor in the forward travel direction and a second main control valve position in which the main fluid pressure is directed to drive the travel motor in the reverse travel direction.

13. The work vehicle of example 12, wherein the hydraulic circuit further comprises: a pilot control device fluidly coupled to provide a pilot fluid pressure to reposition the main control valve between the first main control valve position and the second main control valve position; and a directional switching valve fluidly coupled in between the pilot control device and the main control valve, the directional switching valve having a first directional switching position associated with the first propulsion direction mode and a second directional switching position associated with the second propulsion direction mode.

14. The work vehicle of example 13, wherein the pilot control device is fluidly coupled to the main control valve via the directional switching valve with a first pilot signal line and a second pilot signal line to supply the pilot fluid pressure to the main control valve.

15. The work vehicle of example 14, wherein, when the directional switching valve is in the first directional switching valve position, the pilot fluid pressure from the pilot control device is maintained in the first pilot signal line and the second pilot signal line relative to the main control valve; and wherein, when the directional switching valve is in the second directional switching valve position, the pilot fluid pressure from the pilot control device is swapped in the first pilot signal line and the second pilot signal line relative to the main control valve.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A propulsion control system for a work vehicle with a track assembly, comprising:
a travel motor configured to be actuated in a forward travel direction to drive the track assembly in the forward travel direction and in a reverse travel direction to drive the track assembly in the reverse travel direction;
at least one propulsion control device configured to be actuated by an operator in a first input direction and a second input direction; and
a propulsion switching mechanism coupled to the travel motor and the at least one propulsion control device;
wherein the propulsion switching mechanism is configured to be operated in a first propulsion direction mode in which, when the at least one propulsion control device is actuated in the first input direction, the travel motor is actuated to drive the track assembly in the forward travel direction, and when the at least one propulsion control device is actuated in the second input direction, the travel motor is actuated to drive the track assembly in the reverse travel direction;

wherein the propulsion switching mechanism is configured to be operated in a second propulsion direction mode in which, when the at least one propulsion control device is actuated in the first input direction, the travel motor is actuated to drive the track assembly in the reverse travel direction, and when the at least one propulsion control device is actuated in the second input direction, the travel motor is actuated to drive the track assembly in the forward travel direction; and wherein the propulsion switching mechanism includes a hydraulic circuit comprising:

a pump fluidly coupled to the travel motor to provide main fluid pressure to drive the travel motor; and a main control valve fluidly coupled in between the pump and the travel motor to control the main fluid pressure to the travel motor, the main control valve having a first main control valve position in which the main fluid pressure is directed to drive the travel motor in the forward travel direction and a second main control valve position in which the main fluid pressure is directed to drive the travel motor in the reverse travel direction.

2. The propulsion control system of claim 1, wherein the hydraulic circuit further comprises:

a pilot control device fluidly coupled to provide a pilot fluid pressure to reposition the main control valve between the first main control valve position and the second main control valve position; and a directional switching valve fluidly coupled in between the pilot control device and the main control valve, the directional switching valve having a first directional switching position associated with the first propulsion direction mode and a second directional switching position associated with the second propulsion direction mode.

3. The propulsion control system of claim 2, wherein the pilot control device is fluidly coupled to the main control valve via the directional switching valve with a first pilot signal line and a second pilot signal line to supply the pilot fluid pressure to the main control valve.

4. The propulsion control system of claim 3, wherein, when the directional switching valve is in the first directional switching valve position, the pilot fluid pressure from the pilot control device is maintained in the first pilot signal line and the second pilot signal line relative to the main control valve, and wherein, when the directional switching valve is in the second directional switching valve position, the pilot fluid pressure from the pilot control device is swapped in the first pilot signal line and the second pilot signal line relative to the main control valve.

5. The propulsion control system of claim 4, further comprising a controller configured to reposition the directional switching valve between the first directional switching valve position and the second directional switching valve position.

6. The propulsion control system of claim 5, further comprising a propulsion direction mode selection switch coupled to the directional switching valve;

wherein the propulsion direction mode selection switch is configured to receive a first direction mode selection input representing the first propulsion direction mode and, in response, to command the directional switching valve into the first directional switching valve position; and wherein the propulsion direction mode selection switch is configured to receive a second direction mode selection input representing the second propulsion direction mode and, in response, to command the directional switching valve into the second directional switching valve position.

7. The propulsion control system of claim 1, wherein the at least one propulsion control device includes a hand lever configured to be actuated by the operator by pivoting the hand lever away from the operator as the first input direction and towards the operator as the second input direction.

8. The propulsion control system of claim 1, wherein the at least one propulsion control device includes a foot pedal configured to be actuated by the operator by pivoting the foot pedal away from the operator as the first input direction and towards the operator as the second input direction.

9. The propulsion control system of claim 1, wherein the directional switching valve is fluidly coupled to the main control valve with a first pilot signal line and a second pilot signal line, and wherein the directional switching valve has a first directional switching position associated with the first propulsion direction mode and a second directional switching position associated with the second propulsion direction mode;

wherein the travel motor is fluidly coupled to the main control valve via a first main line and a second main line;

wherein, when in the first propulsion direction mode and when the operator actuates the at least one propulsion control device in the first input direction, the directional switching valve directs the pilot fluid pressure from the pilot control device through the first pilot signal line to place the main control valve in the first main control valve position such that main fluid pressure from the pump is directed through the first main line to actuate the travel motor in the first travel direction;

wherein, when in the first propulsion direction mode and when the operator actuates the at least one propulsion control device in the second input direction, the directional switching valve directs the pilot fluid pressure from the pilot control device through the second pilot signal line to place the main control valve in the second main control valve position such that main fluid pressure from the pump is directed through the second main line to actuate the travel motor in the second travel direction;

wherein, when in the second propulsion direction mode and when the operator actuates the at least one propulsion control device in the second input direction, the directional switching valve redirects the pilot fluid pressure from the pilot control device into the first pilot signal line to place the main control valve in the first main control valve position such that main fluid pressure from the pump is directed through the first main line to actuate the travel motor in the first travel direction; and wherein, when in the second propulsion direction mode and when the operator actuates the at least one propulsion control device in the first input direction, the directional switching valve redirects the pilot fluid pressure from the pilot control device into the first pilot signal line to place the main control valve in the second main control valve position such that main fluid pressure from the pump is directed through the second main line to actuate the travel motor in the second travel direction.

10. A work vehicle, comprising:
a frame;
a cabin mounted on the frame;
a propulsion control device arranged within the cabin and configured to be actuated by an operator in a first input direction and a second input direction;
a ground engaging mechanism mounted to the frame;
a travel motor coupled to the frame and the ground engaging mechanism, the travel motor configured to selectively drive the ground engaging mechanism based on commands from the propulsion control device in a forward travel direction and in a reverse travel direction; and
a propulsion switching mechanism coupled to the travel motor and the at least one propulsion control device;
wherein the propulsion switching mechanism is configured to be operated in a first propulsion direction mode in which, when the at least one propulsion control device is actuated in the first input direction, the travel motor is actuated to drive the ground engaging mechanism in the forward travel direction, and when the at least one propulsion control device is actuated in the second input direction, the travel motor is actuated to drive the ground engaging mechanism in the reverse travel direction;
wherein the propulsion switching mechanism is configured to be operated in a second propulsion direction mode in which, when the at least one propulsion control device is actuated in the first input direction, the travel motor is actuated to drive the ground engaging mechanism in the reverse travel direction, and when the at least one propulsion control device is actuated in the second input direction, the travel motor is actuated to drive the ground engaging mechanism in the forward travel direction; and
wherein the propulsion switching mechanism includes a hydraulic circuit and the ground engaging mechanism includes a track assembly, wherein the hydraulic circuit comprises:
a pump fluidly coupled to the travel motor to provide main fluid pressure to drive the travel motor; and
a main control valve fluidly coupled in between the pump and the travel motor to control the main fluid pressure to the travel motor, the main control valve having a first main control valve position in which the main fluid pressure is directed to drive the travel motor in the forward travel direction and a second main control valve position in which the main fluid pressure is directed to drive the travel motor in the reverse travel direction.

11. The work vehicle of claim 10, wherein the hydraulic circuit further comprises:
a pilot control device fluidly coupled to provide a pilot fluid pressure to reposition the main control valve between the first main control valve position and the second main control valve position; and
a directional switching valve fluidly coupled in between the pilot control device and the main control valve, the directional switching valve having a first directional switching position associated with the first propulsion direction mode and a second directional switching position associated with the second propulsion direction mode.

12. The work vehicle of claim 11, wherein the pilot control device is fluidly coupled to the main control valve via the directional switching valve with a first pilot signal line and a second pilot signal line to supply the pilot fluid pressure to the main control valve.

13. The work vehicle of claim 12, wherein, when the directional switching valve is in the first directional switching valve position, the pilot fluid pressure from the pilot control device is maintained in the first pilot signal line and the second pilot signal line relative to the main control valve; and
wherein, when the directional switching valve is in the second directional switching valve position, the pilot fluid pressure from the pilot control device is swapped in the first pilot signal line and the second pilot signal line relative to the main control valve.

14. The work vehicle of claim 13, further comprising a controller configured to reposition the directional switching valve between the first directional switching valve position and the second directional switching valve position.

15. The work vehicle of claim 14, further comprising a propulsion direction mode selection switch coupled to the directional switching valve;
wherein the propulsion direction mode selection switch is configured to receive a first direction mode selection input representing the first propulsion direction mode and, in response, to command the directional switching valve into the first directional switching valve position; and
wherein the propulsion direction mode selection switch is configured to receive a second direction mode selection input representing the second propulsion direction mode and, in response, to command the directional switching valve into the second directional switching valve position.

16. The work vehicle of claim 10, wherein the at least one propulsion control device includes a hand lever configured to be actuated by the operator by pivoting the hand lever away from the operator as the first input direction and towards the operator as the second input direction.

17. The work vehicle of claim 10, wherein the at least one propulsion control device includes a foot pedal configured to be actuated by the operator by pivoting the foot pedal away from the operator as the first input direction and towards the operator as the second input direction.

18. The work vehicle of claim 10, wherein the directional switching valve is fluidly coupled to the main control valve with a first pilot signal line and a second pilot signal line, and wherein the directional switching valve has a first directional switching position associated with the first propulsion direction mode and a second directional switching position associated with the second propulsion direction mode;
wherein the travel motor is fluidly coupled to the main control valve via a first main line and a second main line;
wherein, when in the first propulsion direction mode and when the operator actuates the at least one propulsion control device in the first input direction, the directional switching valve directs the pilot fluid pressure from the pilot control device through the first pilot signal line to place the main control valve in the first main control valve position such that main fluid pressure from the pump is directed through the first main line to actuate the travel motor in the first travel direction;
wherein, when in the first propulsion direction mode and when the operator actuates the at least one propulsion control device in the second input direction, the directional switching valve directs the pilot fluid pressure from the pilot control device through the second pilot signal line to place the main control valve in the second main control valve position such that main fluid pressure from the pump is directed through the second main line to actuate the travel motor in the second travel direction;

wherein, when in the second propulsion direction mode and when the operator actuates the at least one propulsion control device in the second input direction, the directional switching valve redirects the pilot fluid pressure from the pilot control device into the first pilot signal line to place the main control valve in the first main control valve position such that main fluid pressure from the pump is directed through the first main line to actuate the travel motor in the first travel direction;

wherein, when in the second propulsion direction mode and when the operator actuates the at least one propulsion control device in the first input direction, the directional switching valve redirects the pilot fluid pressure from the pilot control device into the first pilot signal line to place the main control valve in the second main control valve position such that main fluid pressure from the pump is directed through the second main line to actuate the travel motor in the second travel direction.

* * * * *